United States Patent
Belnap et al.

(10) Patent No.: US 8,932,377 B2
(45) Date of Patent: Jan. 13, 2015

(54) DEEP LEACH PRESSURE VESSEL FOR SHEAR CUTTERS

(75) Inventors: J. Daniel Belnap, Lindon, UT (US); Peter Thomas Cariveau, Spring, TX (US); Loel Corbett, Saratoga Springs, UT (US); Ronald K. Eyre, Orem, UT (US)

(73) Assignee: Smith International, Inc., Houston, TX (US)

( * ) Notice: Subject to any disclaimer, the term of this patent is extended or adjusted under 35 U.S.C. 154(b) by 138 days.

(21) Appl. No.: 13/409,938

(22) Filed: Mar. 1, 2012

(65) Prior Publication Data

US 2012/0227332 A1 Sep. 13, 2012

Related U.S. Application Data (60) Provisional application No. 61/449,204, filed on Mar. 4, 2011.

(51) Int. Cl.
| | |
|---|---|
| *B24D 3/00* | (2006.01) |
| *B24D 11/00* | (2006.01) |
| *B24D 18/00* | (2006.01) |
| *C09K 3/14* | (2006.01) |
| *B24D 3/02* | (2006.01) |
| *C09C 1/68* | (2006.01) |

(Continued)

(52) U.S. Cl.
CPC ......... *E21B 10/567* (2013.01); *B22F 2005/001* (2013.01); *B22F 2998/00* (2013.01); *C22C 2204/00* (2013.01)
USPC ................... 51/307; 51/293; 51/298; 51/309

(58) Field of Classification Search
USPC ................... 51/307, 293, 298, 309
See application file for complete search history.

(56) References Cited

U.S. PATENT DOCUMENTS

| | | | |
|---|---|---|---|
| 4,104,344 | A | 8/1978 | Pope et al. |
| 4,288,248 | A | 9/1981 | Bovenkerk et al. |

(Continued)

FOREIGN PATENT DOCUMENTS

| | | | |
|---|---|---|---|
| GB | 2465260 A | 5/2010 | |

OTHER PUBLICATIONS

Combined Search and Examination Report issued in corresponding British Patent Application No. GB1203893.1 dated Jun. 7, 2012 (7 pages).

(Continued)

*Primary Examiner* — James McDonough
(74) *Attorney, Agent, or Firm* — Osha • Liang LLP (57) ABSTRACT

A system for producing thermally stable cutting elements may include a heat source, a pressure vessel, at least one polycrystalline diamond body attached to a carbide substrate, and a leaching agent is disclosed, wherein the heat source includes a container comprising at least one receiving mechanism and at least one retention mechanism, and wherein the carbide substrate is disposed in the at least one receiving mechanism of the pressure vessel, and wherein the leaching agent is disposed in the pressure vessel, and wherein the leaching agent removes the catalyzing material from the interstitial spaces interposed between the diamond particles of the at least one polycrystalline diamond body, and wherein the at least one retention mechanism of the pressure vessel seals at least a portion of the carbide substrate into the at least one receiving mechanism and prevents the leaching agent from contacting at least a portion of the carbide substrate.

18 Claims, 6 Drawing Sheets

(51) Int. Cl.
*E21B 10/567* (2006.01)
*B22F 5/00* (2006.01)

(56) References Cited

U.S. PATENT DOCUMENTS

| | | | |
|---|---|---|---|
| 5,127,923 A | 7/1992 | Bunting et al. | |
| 7,608,333 B2 * | 10/2009 | Eyre | 428/408 |
| 7,754,333 B2 * | 7/2010 | Eyre et al. | 428/408 |
| 8,002,859 B2 * | 8/2011 | Griffo et al. | 51/307 |
| 2006/0060391 A1 * | 3/2006 | Eyre et al. | 175/434 |
| 2006/0266559 A1 * | 11/2006 | Keshavan et al. | 175/428 |
| 2007/0169419 A1 * | 7/2007 | Davis et al. | 51/293 |
| 2008/0185189 A1 | 8/2008 | Griffo et al. | |
| 2010/0012391 A1 * | 1/2010 | Shamburger | 175/434 |

OTHER PUBLICATIONS

Examination Report in corresponding UK Application No. 1203893.1 dated May 14, 2013 (1 page).

* cited by examiner

DEEP LEACH PRESSURE VESSEL FOR SHEAR CUTTERS

CROSS-REFERENCE TO RELATED APPLICATIONS

This application claims priority to U.S. Patent Application No. 61/449,204, filed on Mar. 4, 2012, which is herein incorporated by reference in its entirety.

BACKGROUND

1. Technical Field

Embodiments disclosed herein relate generally to systems and methods for producing polycrystalline diamond composites and cutting structures that have high thermal stability. More particularly, embodiments disclosed herein relate to a pressure vessel system capable of removing binder or catalyst material from polycrystalline diamond cutting structures that are attached to a substrate.

2. Background Art

Polycrystalline diamond compact (PDC) cutters have been used in industrial applications including rock drilling and metal machining for many years. In a typical application, a compact of polycrystalline diamond (PCD) (or other superhard material) is bonded to a substrate material, which is typically a sintered metal-carbide to form a cutting structure. PCD comprises a polycrystalline mass of diamonds (typically synthetic) that are bonded together to form an integral, tough, high-strength mass or lattice. The resulting PCD structure produces enhanced properties of wear resistance and hardness, making PCD materials extremely useful in aggressive wear and cutting applications where high levels of wear resistance and hardness are desired.

PCD may be formed by subjecting a volume of diamond grains to certain high-pressure/high-temperature (HPHT) conditions in the presence of a sintering aid or binder. Conventionally, the sintering aid or binder is provided in the form of a solvent metal catalyst material, such as one or more element from Group VIII of the Periodic table. The solvent metal catalyst may be added and mixed with the diamond grains prior to HPHT processing and/or may be provided during the HPHT process by infiltration from a substrate comprising the solvent metal catalyst as one of its constituent materials.

A conventional PDC cutter may be formed by placing a cemented carbide substrate into the container of a press. A mixture of diamond grains or diamond grains and catalyst binder is placed atop the substrate and treated under high pressure, high temperature conditions. In doing so, metal binder (often cobalt) migrates from the substrate and infiltrates into the diamond grain volume to promote intercrystalline bonding therebetween, thereby forming a sintered diamond body that is bonded to the substrate. The substrate often comprises a metal-carbide composite material, such as tungsten carbide. The deposited diamond body may be provided in the form of and referred to as a "diamond layer," a "diamond table," or an "abrasive layer." The solvent metal catalyst material in such conventional PCD is disposed within interstitial regions that exist between bonded-together diamond crystals.

Figure 1:
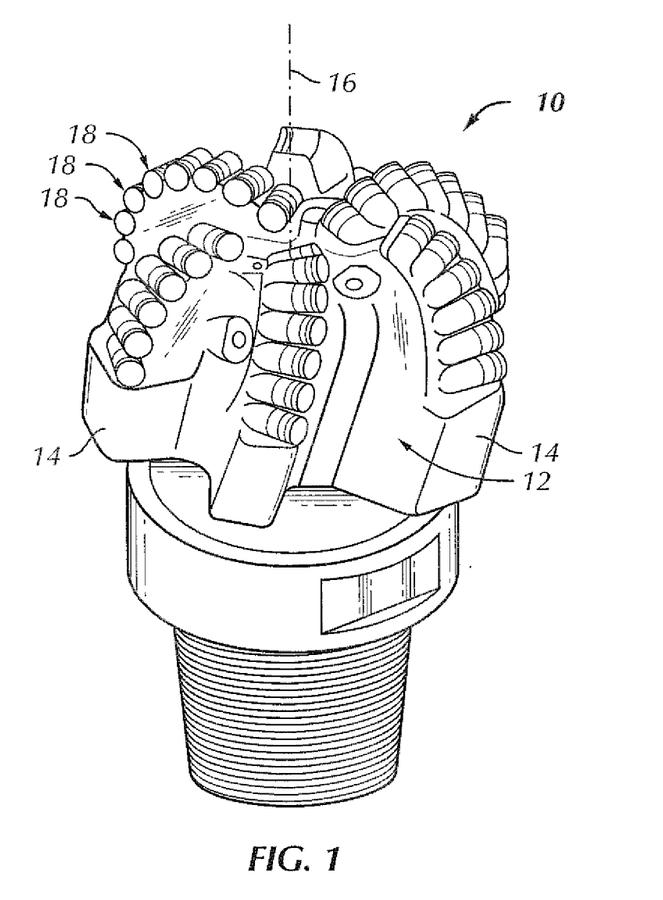
FIG. 1 is an illustration of a PDC drill bit.

An example of a drag bit for earth formation drilling having PDC conventional cutters is shown in FIG. 1. In FIG. 1, a drill bit 10 has a bit body 12. The lower face of the bit body 12 is formed with a plurality of blades 14, which extend generally outwardly away from a central longitudinal axis of rotation 16 of the drill bit. A plurality of cutters 18 are disposed side by side along the length of each blade. The number of cutters 18 carried by each blade may vary. The cutters 18 are individually brazed to a stud-like carrier (or substrate), which may be formed from tungsten carbide, and are received and secured within sockets in the respective blade.

Conventional PCD includes 85 to 95 percent by volume diamond and a balance of the binder or catalyst material, which is present in PCD within the interstices existing between the bonded diamond grains. Binder materials that are typically used in forming PCD include Group VIII elements, with cobalt (Co) being the most common binder material used.

As noted above, PDCs are useful for forming cutting elements, for example, PDC cutters, used in applications calling for high degrees of wear and abrasion resistance, such as drilling subterranean formations. A significant factor in determining the longevity of PDC cutters is the generation of heat at the cutter contact point, specifically at the exposed part of the PCD layer caused by friction between the PCD and the work material being engaged. This heat causes thermal damage to the PCD in the form of cracks (due to differences in thermal expansion coefficients), which lead to spalling of the PCD body or layer, and/or delamination between the PCD body and substrate, and/or back conversion of the diamond to graphite in the PCD body causing rapid abrasive wear. As a result, the thermal operating range of conventional PDC cutters is typically less than about 750° C.

Conventional PCD is stable at temperatures of up to about 700 to 750° C., after which observed increases in temperature may result in permanent damage to and structural failure of PCD. This deterioration in PCD is due to the significant difference in the coefficient of thermal expansion of the binder or catalyst material, for example, as compared to diamond. Upon heating of PCD during use, the catalyst material and the diamond lattice expands at different rates, which may cause cracks to form in the diamond lattice structure and result in deterioration of the PCD. Damage is also due to the catalyzed formation of graphite at diamond-diamond necks at high temperatures, leading to loss of microstructural integrity and strength loss.

Attempts to address these issues have involved removing the catalyst or binder material from the diamond body after the PCD has been formed. Strong acid solutions have been used in some instances to remove or "leach" the catalyst or binder material from the diamond lattice structure. This approach has been practiced on the entire diamond body, where the catalyst material has been removed from the entire diamond body, or has been practiced on only part of or a region of the diamond body. Examples of "leaching" processes may be found, for example, in U.S. Pat. Nos. 4,288,248 and 4,104,344. In these instances, an acid solution, typically nitric acid or combinations of several strong acids (such as nitric and hydrofluoric acid) may be used to treat the diamond table, removing at least a portion of the catalyst or binder material from the PCD. By leaching out the catalyst material from the entire diamond body, thermally stable polycrystalline (TSP) diamond may be formed. In certain embodiments, only a select portion or region of a diamond composite is leached, in order to gain thermal stability without losing impact resistance. As used herein, the term TSP includes both of the above (i.e., partially and completely leached) compounds. Interstitial volumes remaining after leaching may be reduced by either furthering consolidation or by filling the volume with a secondary material, such by processes known in the art and described in U.S. Pat. No. 5,127,923, which is herein incorporated by reference in its entirety.

While conventional leaching processes with nitric/hydrofluoric acid mixtures are somewhat successful in removing the catalyst or binder material from the PCD, they tend to be time consuming, for example, using mixtures of acids may easily take many weeks in order to leach out the catalyst or binder material. Additionally, conventional leaching processes are typically performed prior to the PCD being attached to a substrate, as the acids used in the processes cause significant damage (e.g., erosion) to the substrate. Further, the use and handling of acid solutions such as hydrofluoric acid presents potential safety, health, and environmental dangers. Still further, the use of such conventional leaching techniques presents certain limitations in the degree of catalyst and binder material, as well as other unwanted non-diamond materials, which may be removed from the PCD.

Accordingly, there exists a need for methods and apparatuses that may enhance the process of removing unwanted catalyst or binder materials from the PCD after the PCD is attached to a substrate. There also exists a need for methods and apparatuses that may accelerate the leaching process, and/or reduce the hazards inherent in the leaching process.

SUMMARY

In one aspect, embodiments disclosed herein relate to a system for producing thermally stable cutting elements including a heat source, a pressure vessel, at least one polycrystalline diamond body attached to a carbide substrate, and a leaching agent, wherein the heat source includes a container comprising at least one receiving mechanism and at least one retention mechanism, and wherein the carbide substrate is disposed in the at least one receiving mechanism of the pressure vessel, and wherein the polycrystalline diamond body comprises interconnected diamond particles with a catalyzing material to be removed from the interstitial spaces interposed between the diamond particles, and wherein the leaching agent is disposed in the pressure vessel, and wherein the leaching agent removes the catalyzing material from the interstitial spaces interposed between the diamond particles of the at least one polycrystalline diamond body, and wherein the at least one retention mechanism of the pressure vessel seals at least a portion of the carbide substrate into the at least one receiving mechanism and prevents the leaching agent from contacting at least a portion of the carbide substrate.

In another aspect, embodiments disclosed herein relate to a method of forming at least one leached cutter that includes placing at least one cutter to be leached in a pressure vessel, wherein the at least one cutter comprises a polycrystalline diamond body attached to a carbide substrate, wherein the pressure vessel comprises at least one receiving mechanism and at least one retention mechanism, and wherein the placing comprises disposing the carbide substrate of the at least one cutter in the at least one receiving mechanism of the pressure vessel; placing a leaching agent in the pressure vessel, wherein at least a portion of the polycrystalline diamond body is exposed to the leaching agent, and wherein the at least one retention mechanism of the pressure vessel seals at least a portion of the carbide substrate into the at least one receiving mechanism and prevents the leaching agent from contacting at least a portion of the carbide substrate; and subjecting the pressure vessel and its contents to an elevated temperature and pressure thereby causing the catalyzing material to be substantially removed from at least a portion of the polycrystalline diamond body.

Other aspects and advantages of the invention will be apparent from the following description and the appended claims.

DETAILED DESCRIPTION

In one aspect, embodiments disclosed herein relate to a system for producing thermally stable cutting elements that includes a heat source, a pressure vessel, at least one polycrystalline diamond body attached to a carbide substrate, and a leaching agent disposed in the pressure vessel. In another aspect, embodiments disclosed herein relate to a method of forming leached cutting elements that includes forming at least one cutting element and placing the at least one cutting element in a pressure vessel having a leaching agent disposed therein and subjecting the pressure vessel to high pressures and high temperatures, wherein the pressure vessel includes at least one receiving mechanism and at least one retention mechanism for receiving and retaining the at least one cutting element in the pressure vessel, and wherein the receiving and retention mechanisms are capable of protecting the substrate of the at least one cutting element from being exposed to, and thereby harmed by, the leaching agent.

Specifically, embodiments disclosed herein involve accelerating techniques used in conjunction with treatments of a leaching agent to remove undesired material (such as a catalyst) used in the manufacture of a cutting element. The accelerating techniques that may be used in conjunction with conventional leaching processes in various embodiments of the present disclosure include elevated pressures and elevated temperatures.

Conventional accelerating leaching processes are typically performed prior to the PCD being attached to a substrate (i.e., prior to formation of a cutting element). Specifically, when accelerating a leaching process, such as by pressure, it has previously been impossible to protect the substrate from the acids used in the processes, which cause significant damage (e.g., erosion and/or crumbling) to the substrate. Accordingly, embodiments disclosed herein relate to systems and methods for providing accelerated leaching of cutting elements (i.e., PCD attached to a substrate) while protecting the substrate from exposure to the leaching agent.

In various embodiments, a formed cutting element, i.e., a PCD table attached to a carbide substrate wherein the PCD table includes catalyst material in the interstitial spaces between bonded diamond grains, is subjected to a leaching process in conjunction with at least one accelerating technique. In one embodiment, the leaching process may include exposing the PCD table to a leaching agent in order to remove catalyst material therefrom without exposing the substrate to the leaching agent. It is important to protect the substrate from exposure to the leaching agent because the leaching agent may cause the substrate to erode or crumble.

As used herein, the term "removed" refers to the reduced presence of catalyst material in the PCD table, and is understood to mean that a substantial portion of the catalyst material no longer resides in the PCD table. However, one skilled in the art would appreciate that trace amounts of catalyst material may still remain in the microstructure of the PCD table within the interstitial regions and/or adhered to the surface of the diamond grains.

The quantity of the catalyst material remaining in the material PCD microstructure after the cutting element has been subjected to a leaching treatment may vary, for example, on factors such as the treatment conditions, including treatment time. Further, one skilled in the art would appreciate that it may be desired in certain applications to allow a small amount of catalyst material to remain in the cutting element. In a particular embodiment, the cutting element may include up to 1-2 percent by weight of the catalyst material in the PCD table. However, one skilled in the art would appreciate that the amount of residual catalyst present in a leached cutter may depend on the diamond density of the material, and body thickness.

As described above, a conventional leaching process involves the exposure of an object to be leached with a leaching agent, such as described in U.S. Pat. No. 4,224,380, which is herein incorporated by reference in its entirety. In select embodiments, the leaching agent may be a weak, strong, or mixtures of acids. In other embodiments, the leaching agent may be a caustic material such as NaOH or KOH. Suitable acids may include, for example, nitric acid, hydrofluoric acid, hydrochloric acid, sulfuric acid, phosphoric acid, or perchloric acid, or combinations of these acids. In addition, caustics, such as sodium hydroxide and potassium hydroxide, have been used to the carbide industry to digest metallic elements from carbide composites. In addition, other acidic and basic leaching agents may be used as desired. Those having ordinary skill in the art will appreciate that the molarity of the leaching agent may be adjusted depending on the time desired to leach, concerns about hazards, etc.

While conventional leaching techniques typically require first removing the PCD table from the carbide substrate of the cutting element to be leached, and then require many weeks for sufficient removal of catalyst material from a PCD body to occur, in accordance with the present disclosure, accelerating techniques may be applied to the leaching process while the PCD table is attached to the carbide substrate and may decrease the amount of treatment time required to reach the same level of catalyst removal or, alternatively, to increase the depth of leaching achieved in the same amount of time while protecting the substrate from exposure to the leaching agent. In a particular embodiment, the leaching of a cutting element may be accelerated by subjecting the leaching environment and thus the cutting element to an elevated pressure. As used herein, the term "elevated pressure" refers to pressures greater than atmospheric pressure. Suitable pressure levels may include elevated pressure levels ranging from about 1.2 to 345 bar (or, alternatively, 20 to 5000 psi), and in one embodiment, pressure levels used may range from about 1.2 to 100 bar (or, alternatively, 20 to 1500 psi). However, one skilled in the art would appreciate that the particular pressure may be dependent, for example, on the particular equipment used, the temperature selected, amount (and type) of leaching agent present, and total system volume.

According to preferred embodiments of the present disclosure, cutting elements that include a PCD table to be leached may be disposed in a pressure vessel with leaching agent(s) and subsequently exposed to elevated temperatures and pressures, wherein the substrate of the cutting element is protected from exposure to the leaching agent(s). As used herein, the term "elevated temperature" refers to a temperature that is close to or above the boiling point of the liquid in which the PCD body to be leached is submersed. Suitable temperature levels may range from at or near the boiling point to three times the boiling point of the leaching agent solution, for example, from about 35 to 350° C. in one embodiment, and from about 175 to 225° C. in another embodiment. In one or more other embodiments, elevated temperature levels may range up to 300° C. Further, one skilled in the art would appreciate that the selection of an elevated temperature may be dependent, for example, on the type of leaching agent selected, so that, for example, the boiling point may be reached while still avoiding flash boiling of the leaching agent. Further, the source of the elevated temperatures is not a limitation of the scope of the present disclosure. Thus, one skilled in the art would appreciate that such heating may be provided, for example, conventional resistance-based heating such as conventional oven or furnace heating or a volumetric-based heating such as microwave heating.

Elevated pressure conditions may be obtained, for example, by conducting a leaching process in a pressure vessel. Suitable pressure vessels include any type of closed environment or container in which a leaching process may be performed with application of elevated pressure levels. One of ordinary skill in the art would appreciate that depending on the various combinations of accelerating techniques, the leaching may be performed for example, in an open container placed within a closed container, where the closed container is pressurized, or in a closed pressurized container (optionally within a second closed container). For example, one skilled in the art would appreciate that when using a closed container, the elevated pressures may be derived from (and thus dependent on) vapor pressures contained within the container at elevated temperatures. Thus, the extent of the pressure elevation may be a function of the temperature, amount of leaching agent present, and total system volume.

Figure 2:
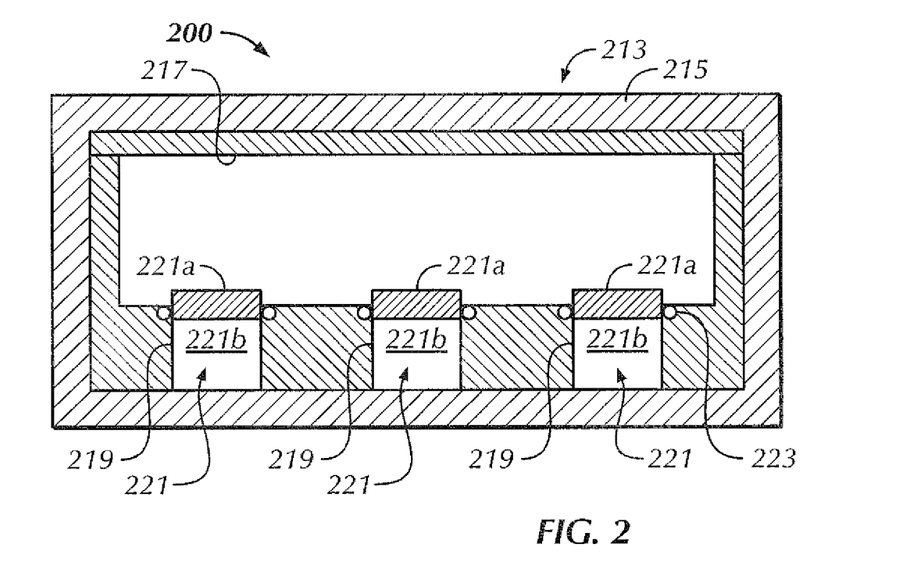
FIG. 2 shows pressure vessels in accordance with embodiments of the present disclosure.

Referring to FIG. 2, a pressure vessel according to one embodiment of the present disclosure is shown. Pressure vessel 200 includes container 213 (which may be comprised of two parts: body 215 and liner 217) having receiving mechanisms 219 in which cutting elements 221 (i.e., diamond table 221*a* fainted on and/or attached to carbide substrate 221*b*) are disposed, and retention mechanisms 223 which may be capable of sealing cutting elements 221 into receiving mechanisms 219 and thereby preventing at least a portion of the cutting elements 221, including at least the carbide substrate 221*b*, from being exposed to leaching agents while at least a portion of the cutting elements 221, including at least a portion of the diamond table 221*a*, may be exposed to the leaching agents. Container body 215 may be of a material of construction having sufficient strength (tensile strength) and other physical characteristics, including dimensions, so that it can withstand internal temperatures and pressures in ranges likely to be encountered in various heating and digestion operations in which the container may be employed. Such pressure ranges may range, for example, up to 5000 psi.

Additionally, various components of the pressure vessel (e.g., container body 215, liner 217, receiving mechanisms 219, and retention mechanisms 223) may be essentially or completely transparent to microwave radiation and may also be resistant to damage from chemical attack by strong chemicals, such as strong acids, often employed as leaching agents. In preferred embodiments of the present disclosure, materials of construction suitable for manufacture of such components may include fluorinated alkylenes or perfluorocarbons, for example, polytetrafluoroethylene and other polymers of this type sold under the tradename TEFLON® or other tradenames may be employed.

In another embodiment, chemically resistant plastics, such as chloroprene, silicone, polyethylene, polypropylene and other suitable polymers, under the proper circumstances, may also be used. However, at elevated temperatures, such polymers and others which are satisfactorily resistant to chemical reactions with the materials being heated or by the digestion mixes may not be sufficiently strong to resist pressures that may be developed in the container and therefore such may normally be employed within strengthening body members which are made of other, stronger materials. Further, one skilled in the art would appreciate that, in alternative embodiments, the liner and body of the vessel may be made of a single material, without the need for a separate liner. For example, when using microwave heating, if microwave- and other radiant energy-transmissive materials that are available or may become available are satisfactorily resistant to chemical damage from the contained materials and are strong enough to resist pressures developed during the heating of such materials in the closed container the container body may be made of one piece of one material, without the need for a separate liner.

According to preferred embodiments of the present disclosure, retention mechanisms 223 may protect at least a portion of the cutting elements 221 by preventing strong chemicals, for example, strong acids used as leaching agents, from contacting certain portions of the cutting elements 221, including at least the carbide substrate 221b. Retention mechanisms 223 may include, for example, TEFLON® coated o-rings (e.g., similar to those shown as 223 in FIGS. 2, 3A, and 4A), press fitting of cutting elements 221 into the pressure vessel (shown in FIGS. 3B and 4B), a pressure flange to enhance sealing capability during pressurization (shown in FIGS. 3C and 4C), and/or a ceramic ring (shown in FIGS. 3D and 4D), each of which are discussed in greater detail below.

Figure 3A:
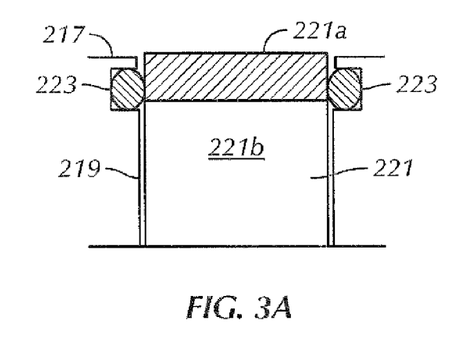
FIGS. 3A-3D show retention mechanisms in accordance with embodiments of the present disclosure.
Figure 4A:
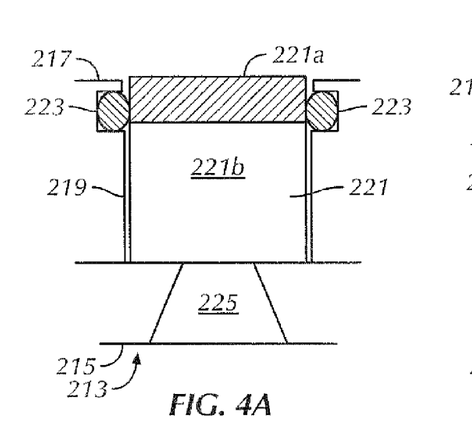
FIGS. 4A-4D show retention mechanisms in accordance with embodiments of the present disclosure.

As shown in FIGS. 3A and 4A, in some embodiments of the present disclosure, poly tetrafluoroethylene coated o-rings 223 may interface with a surface of cutting element 221 and thereby seal off at least a portion of the cutting element, including at least carbide substrate 221b, from exposure to the strong chemicals, such as strong acids, used as leaching agents, while allowing at least a portion of the cutting element 221, including at least a portion of diamond table 221a, to be exposed to the leaching agents. Polytetrafluoroethylene coated o-rings may be advantageous because they may be able to withstand the increased temperatures and pressures used to leach the PCD in the pressure vessel 200.

Figure 3B:
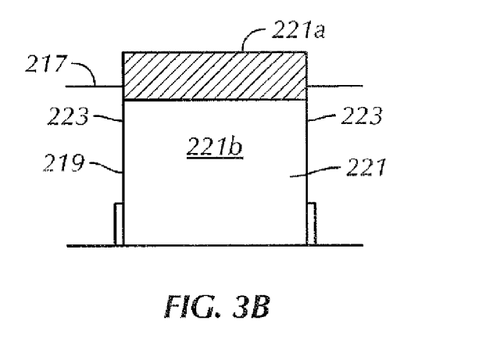
Figure 4B:
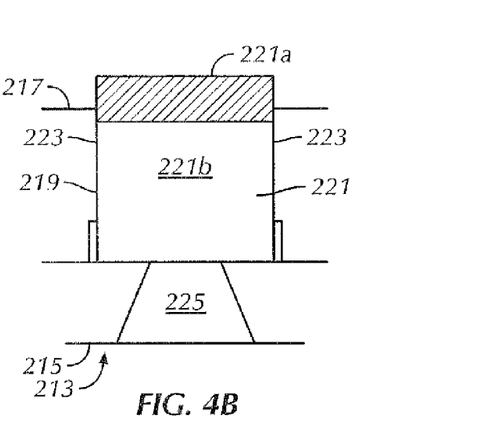

As shown in FIGS. 3B and 4B, in some embodiments of the present disclosure, cutting elements 221 may be press-fit into receiving mechanisms 219, whereby receiving mechanisms 219 may interface with a surface of cutting element 221 and thereby seal off at least a portion of the cutting element 221, including at least carbide substrate 221b, from exposure to the strong chemicals, such as strong acids, used as leaching agents, while allowing at least a portion of the cutting element 221, including at least a portion of diamond table 221a, to be exposed to the leaching agents. As discussed above, liner 217 and receiving mechanisms 219 are preferably made of materials such as polytetrafluoroethylene, but other chemically resistant plastics, such as chloroprene, silicone, ethylene, propylene and other suitable polymers, under the proper circumstances, may also be used. Selection of a particular material may be based on the leaching conditions to be used.

Figure 3C:
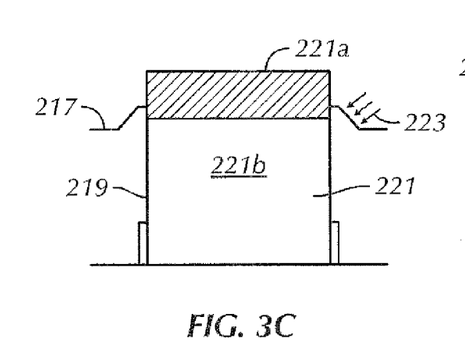
Figures 4C, 4D:
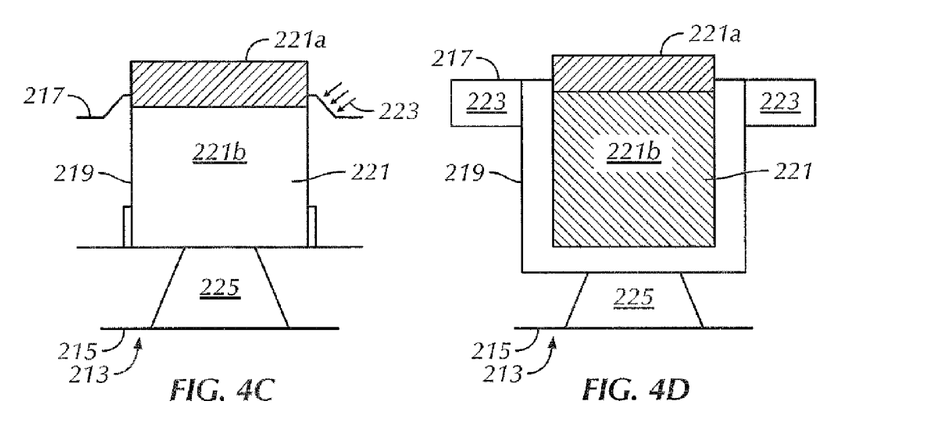

As shown in FIGS. 3C and 4C, in some embodiments of the present disclosure, cutting elements 221 may be press-fit into receiving mechanisms 219, wherein receiving mechanisms 219 are designed to have a retention mechanism such as, for example, a pressure flange 223, which may enhance the sealing capability during pressurization and thereby seal off at least a portion of the cutting element 221, including at least carbide substrate 221b, from exposure to the strong chemicals, such as strong acids, used as leaching agents, while allowing at least a portion of the cutting element 221, including at least a portion of diamond table 221a, to be exposed to the leaching agents. As discussed above, liner 217 and receiving mechanisms 219 may be made of materials such as polytetrafluoroethylene, but other chemically resistant plastics, such as chloroprene, silicone, ethylene, propylene and other suitable polymers, under the proper circumstances, may also be used.

Figure 3D:
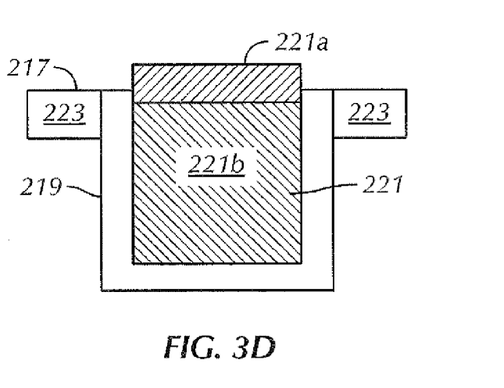

As shown in FIGS. 3D and 4D, in some embodiments of the present disclosure, cutting elements 221 may be press-fit into receiving mechanisms 219 and clamped into place using retention mechanisms 223, wherein receiving mechanisms 219 comprise a polytetrafluoroethylene cup 219, and wherein retention mechanisms 223 comprise a ceramic ring 223. Ceramic ring 223 may provide clamping pressure capable of sealing off at least a portion of the cutting element 221, including at least carbide substrate 221b, from exposure to the strong chemicals, such as strong acids, used as leaching agents, while allowing at least a portion of the cutting element 221, including at least a portion of diamond table 221a, to be exposed to the leaching agents. Ceramic ring 223 may be made of materials such as oxides, nitrides, carbides, borides, carbonitrides. Aluminum oxide is an example of a ceramic material exhibiting sufficient strength and inertness to be useful as such a device. Ceramic rings may be advantageous because they may be able to withstand the increased temperatures and pressures used to leach the PCD in the pressure vessel 200. Additionally, as shown in FIG. 2B, polytetrafluoroethylene cup 219 and ceramic ring 223 may be tapered 220 to accommodate multiple press fits using the same components in production.

Figure 5A:
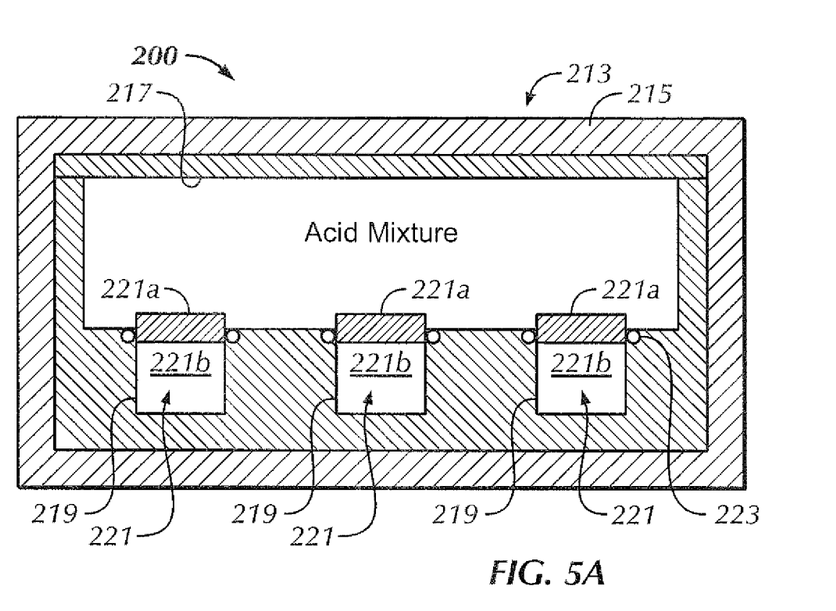
FIGS. 5A-5B show pressure vessels in accordance with embodiments of the present disclosure.
Figure 5B:
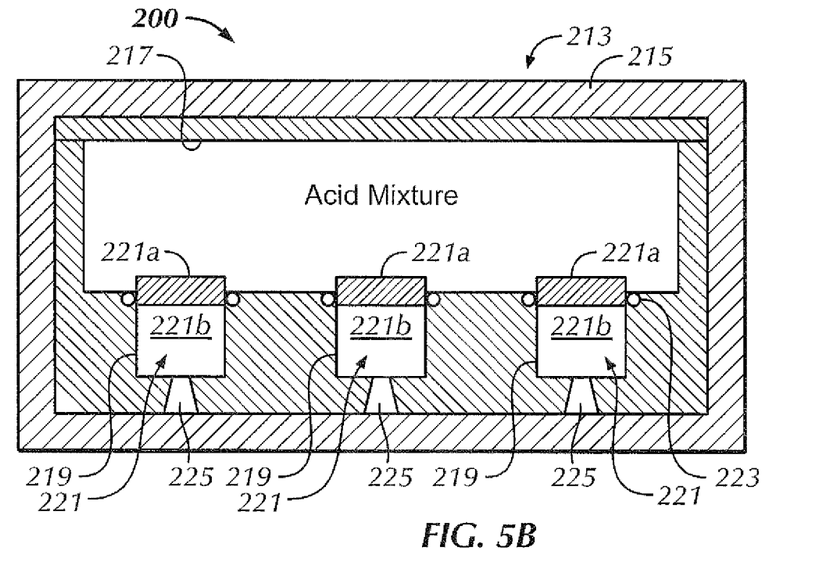

As shown in FIGS. 2 and 5A-5B, in some embodiments of the present disclosure, receiving mechanisms 219 (and therefore cutting elements 221) may be isolated from one another in case of failure of retention mechanisms 223. Although three receiving mechanisms 219 are shown, this is not intended to be limiting on the present disclosure. Rather, in alternative embodiments, vessel 200 may have any number of receiving mechanisms 219.

Additionally, as shown in FIGS. 4A-4D, in addition to retention mechanisms 223, cutting elements 221 may be vacuum sealed 225 into receiving mechanisms 219 to decrease push-out air pressure during the leaching process (i.e., wherein the cutting elements 221 are held in place using any of the retention mechanisms 223 described above and shown in FIGS. 3A-3D and 5A-5B). The use of vacuum pressures in regions 225 may also aid in cutter extraction by providing push-out pressure after the cutting element(s) have been leached (e.g., vacuum pressure in regions 225 may pull cutting elements 221 into the cavity and create a seal; pressurizing the same regions 225 after the process may help in removal of the cutting elements 221).

Figure 6:
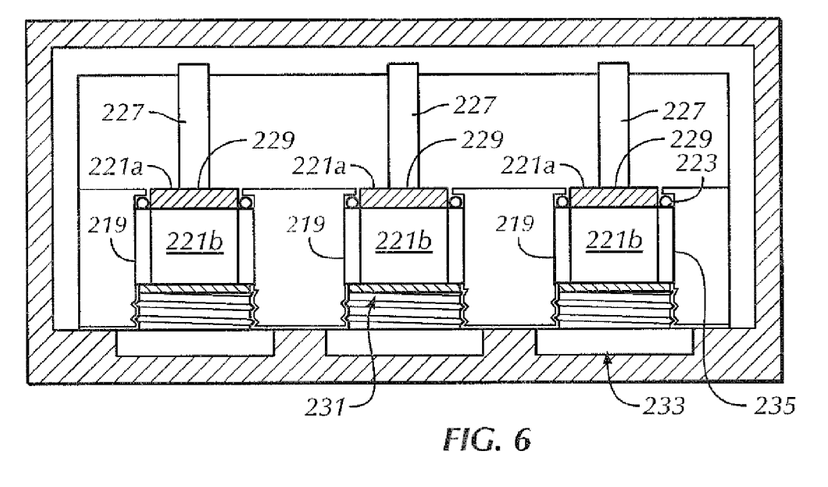
FIG. 6 shows a pressure vessel in accordance with an embodiment of the present disclosure.

Additionally, mechanical devices may be used in addition to any of the retention mechanisms 223 shown in FIGS. 3A-3D and 4A-4D. Such mechanical devices may also function as retention mechanisms for cutting elements 221 by further securing cutting elements 221 in receiving mechanisms 219, which may be useful, for example, in the event of retention mechanism failure. For example, as shown in FIG. 6, in addition to retention mechanisms 223, retention/positioning pins 227 may be provided to oppose any compressive force which may push the cutting elements 221 up and out of receiving mechanisms 219, wherein receiving mechanisms 219 may comprise a cup or hole in container body 213, and wherein retention mechanisms 223 may comprise annular rings around the PCD diameter 221b of cutting elements 221. Such receiving mechanisms 219 may further comprise, for example, elastomer pressure plates 231, threaded pressure nuts 233, and/or pressure sleeves 235, comprising materials such as polytetrafluoroethylene, which secure the product within the protective sleeve and which keep the product from slipping when pressures are raised in the acid chamber.

In preferred embodiments of the present disclosure, retention/positioning pins 227 may be made of materials such as polytetrafluoroethylene. Alternatively, depending on the circumstances, other chemically resistant plastics, such as chloroprene, silicone, ethylene, propylene and other suitable polymers, and other ceramic materials as previously listed may also be used. Retention/positioning pins 227 are preferably positioned within vessel 200 and above cutting elements 221 so that one end of retention/positioning pins 227 interfaces with the radially innermost portion (e.g., the center) of the top surface 229 of cutting elements 221.

Further, as mentioned above, while the above discussion has applied to PCD cutting elements, those having ordinary skill in the art will appreciate that these techniques may be more generally applied to any material that requires the leaching of a material (such as a catalyst) from its surrounding matrix. For example, embodiments disclosed herein may also apply to "free-standing" PCD bodies, such as, PCD wafers having no carbide substrate. Such PCD bodies may have been formed "free-standing" or may have been detached from a carbide substrate prior to leaching.

EXAMPLES

In accordance with one embodiment of the present disclosure, a plurality of carbide substrates having PCD bodies attached thereto are press fit into cups formed in the liner of a pressure vessel which contains a selected amount of leaching agent, wherein at least a portion of the PDC bodies protrude out from the cups and are exposed to the leaching agent, and wherein retention mechanisms, for example, TEFLON coated o-rings, are used to retain the carbide substrates within the cups and protect the carbide substrates from being exposed to the leaching agent. The exposed PDC bodies remain exposed for a selected time to elevated temperatures, for example 160° C., and experience elevated pressure levels, for example, 500 psi (or around 34 bar).

Those having ordinary skill in the art will appreciate that in other embodiments the temperature and pressure levels may be adjusted to control the overall leaching depth and time. It should also be appreciated that other factors may be adjusted to achieve a desired leaching depth and time, including the diamond density of the PDC bodies to be leached and the type and amount of leaching agent used. Additionally, in one or more embodiments, ultrasonic techniques, or other agitation techniques, may be used in conjunction with elevated pressure and temperature techniques to achieve a desired accelerated leach.

Advantageously, embodiments disclosed herein may provide systems and methods for producing thermally stable cutting elements by partially leaching a cutter, i.e., by leaching the diamond table without affecting the carbide substrate. Additionally, embodiments disclosed herein may provide a reduced leaching time as compared to prior art techniques that require the substrate to be removed from the PCD prior to leaching. Furthermore, embodiments may allow the use of weaker acids, which may reduce the likelihood of injury during the manufacturing process and/or the use of acids at higher temperatures without the loss of acid to evaporation which can be dangerous.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A system for producing thermally stable cutting elements, comprising:
a heat source;
a pressure vessel capable of operating under a pressure of 1.2 to 345 bar, comprising:
a container comprising at least one receiving mechanism and at least one retention mechanism;
at least one polycrystalline diamond body attached to a carbide substrate, wherein the carbide substrate is disposed in the at least one receiving mechanism of the pressure vessel, and wherein the polycrystalline diamond body comprises interconnected diamond particles with a catalyzing material to be removed from the interstitial spaces interposed between the diamond particles;
a leaching agent, wherein the leaching agent is disposed in the pressure vessel, and wherein the leaching agent removes the catalyzing material from the interstitial spaces interposed between the diamond particles of the at least one polycrystalline diamond body; and
wherein the at least one retention mechanism of the pressure vessel seals at least a portion of the carbide substrate into the at least one receiving mechanism and prevents the leaching agent from contacting at least a portion of the carbide substrate.

2. The system of claim 1, wherein the leaching agent comprises at least one of nitric acid, hydrofluoric acid, and mixtures thereof.

3. The system of claim 1, wherein the pressure vessel further comprises a liner.

4. The system of claim 3, wherein the at least receiving mechanism comprises a hole in the liner of the pressure vessel.

5. The system of claim 3, wherein the at least one receiving mechanism comprises a cup in the liner of the pressure vessel.

6. The system of claim 1, wherein the at least one retention mechanism comprises an annular ring.

7. The system of claim 6, wherein the annular ring comprises an o-ring.

8. The system of claim 6, wherein the annular ring comprises a ceramic material having sufficient rigidity to withstand high pressure and high temperature conditions.

9. The system of claim 1, wherein the carbide substrate is press fit into the at least one receiving mechanism.

10. The system of claim 1, wherein the carbide substrate is vacuum sealed into the at least one receiving mechanism.

11. The system of claim 1, wherein the at least one receiving mechanism further comprises a pressure flange.

12. The system of claim 1, comprising:
two or more polycrystalline diamond bodies attached to carbide substrates; and
two or more receiving mechanisms in the pressure vessel, wherein the two or more receiving mechanisms are isolated from each other, and wherein the carbide substrates are disposed in the two or more receiving mechanisms.

13. The system of claim 1, wherein the at least one receiving mechanism comprises a pressure sleeve.

14. The system of claim 13, further comprising a pressure plate, wherein the pressure plate comprises an elastomeric material.

15. The system of claim 13, further comprising threaded pressure nuts.

16. The system of claim 1, further comprising at least one retention pin, comprising:
- an elongated body having a first end and a second end, wherein the first end interfaces a radially interior region of a top surface of the at least one polycrystalline diamond body attached to a carbide substrate, wherein the second end interfaces an inner surface of the container; and
- wherein the at least one retention pin retains the at least one polycrystalline diamond body attached to a carbide substrate in the at least one receiving mechanism.

17. The system of claim 1, wherein the pressure vessel is capable of operating under a pressure of about 30 to 345 bar.

18. The system of claim 1, wherein the pressure vessel is designed to provide a closed environment in which a leaching process is performed.

* * * * *